United States Patent [19]
Mortlock

[11] 3,887,988
[45] June 10, 1975

[54] METHOD OF PRODUCING FURNITURE
[76] Inventor: Walter John Mortlock, 46 Macarthur Rd., East Camden, New South Wales, Australia
[22] Filed: Aug. 29, 1973
[21] Appl. No.: 392,390

[52] U.S. Cl................. 29/416; 29/412; 144/309 R; 312/204; 312/257 R
[51] Int. Cl............................................ B23p 17/00
[58] Field of Search .. 29/416, 412; 312/204, 257 R, 312/257 SM; 144/309 R, 313, 314 R, 314 B, 315 R, 318, 319

[56]                References Cited
        UNITED STATES PATENTS
3,102,564   9/1963   Ziegler........................... 144/314 R
3,434,385   3/1969   Ray................................. 144/144 X
3,538,967   11/1970  Hensley.............................. 144/318
3,734,153   5/1973   Reed............................ 144/309 R X Primary Examiner—C. W. Lanham
Assistant Examiner—Victor A. DiPalma
Attorney, Agent, or Firm—Ladas, Parry, Von Gehr, Goldsmith & Deschamps

[57]                ABSTRACT

The production of a frontispiece for furniture which includes cutting a sheet of laminate surfaced particle board to the desired size, cutting out of same by a rotatable routing tool at least one panel to form a door or drawer front, and securing over the raw edge of the panel, and/or the resulting aperture in the sheet, edging strips which substantially close the gap of the cut and provide an attractive finish to the frontispiece.

11 Claims, 5 Drawing Figures

PATENTED JUN 10 1975 3,887,988

SHEET 2

PATENTED JUN 10 1975 3,887,988

SHEET 3

METHOD OF PRODUCING FURNITURE

This invention relates to the production of furniture. Throughout this specification the term "furniture" is intended to include not only separate and movable items of furniture but also cabinets, cupboards, presses and wardrobes, and the like, which are provided as fixtures and are sometimes even assembled in situ.

Due to the requirement for skilled labour quality furniture, which almost invariably is provided with an attractive frontispiece, is quite costly. The method of consturction of this frontispiece entails painstaking fitting of drawer fronts and/or doors often of irregular shape to a frame of many timber pieces. Matching of timber grain is frequently necessary.

Whereas veneered and laminate surfaced particle board sheets are far less susceptable to distortion after cutting than conventional timber sheets the use of same has been restricted due to the need for edge treatment after cutting and the inability to anchor hinges within these edges.

It is the principal object of the invention to provide a method of producing furniture, and frontispieces therefor, which requires less skilled labour than hitherto.

Another object is to provide such a method which is capable of performance where the workpiece is a sheet of veneered and laminate particle board.

In accordance with the invention there is provided a method of producing for furniture a frontispiece of sheet material provided with at least one aperture for access therethrough and a displaceable panel for covering the aperture, said method comprising cutting out said panel from said sheet material to leave an aperture in the latter, and securing in position edging strips whereby when the panel is returned to the aperture said strips are located to occupy at least some of the gap, of the cut, between the panel and the sheet.

Also according to the invention there is provided a method of producing for furniture a frontispiece of sheet material provided with at least one aperture for access therethrough and a displaceable panel for covering the aperture, said method comprising placing said sheet material on a worktable adjacent a rotatable routing tool, advancing the routing tool to cut into the sheet material, imparting predetermined relative movement between the sheet material and the routing tool whereby the latter progressively cuts out a panel from the former to leave a predetermined aperture, and subsequently securing in position edging strips whereby when the panel is returned to the aperture said strips are located to occupy at least some of the gap, represented by the cut of the routing tool, and located between the panel and the sheet.

The invention also provides furniture, and frontispieces therefor, produced by the above methods.

A preferred form of the invention is illustrated in the accompanying drawings, in which.

Figure 1:
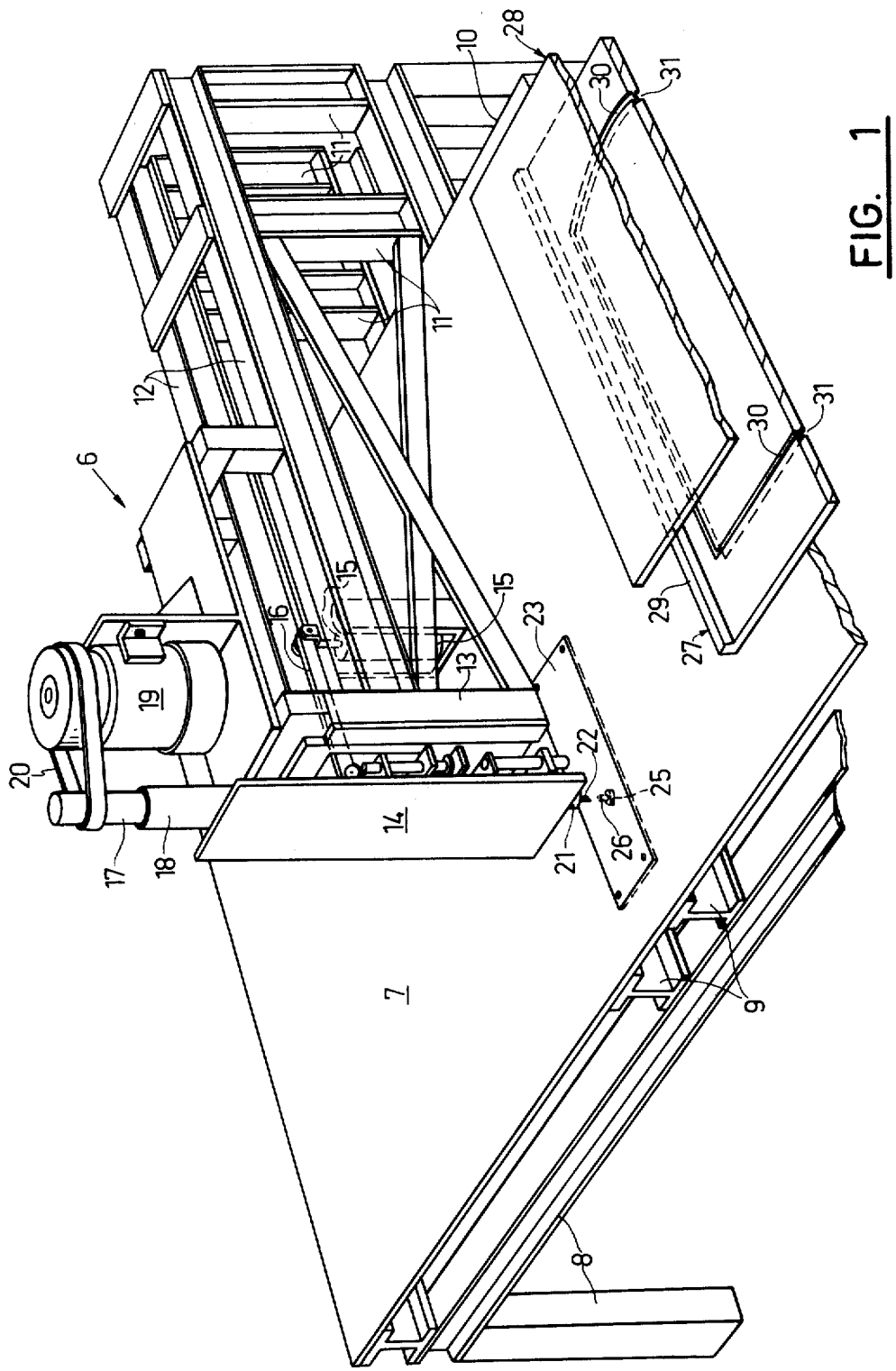
FIG. 1 is a general perspective of the machine used to cut out door and other openings in sheet material.
Figure 3:
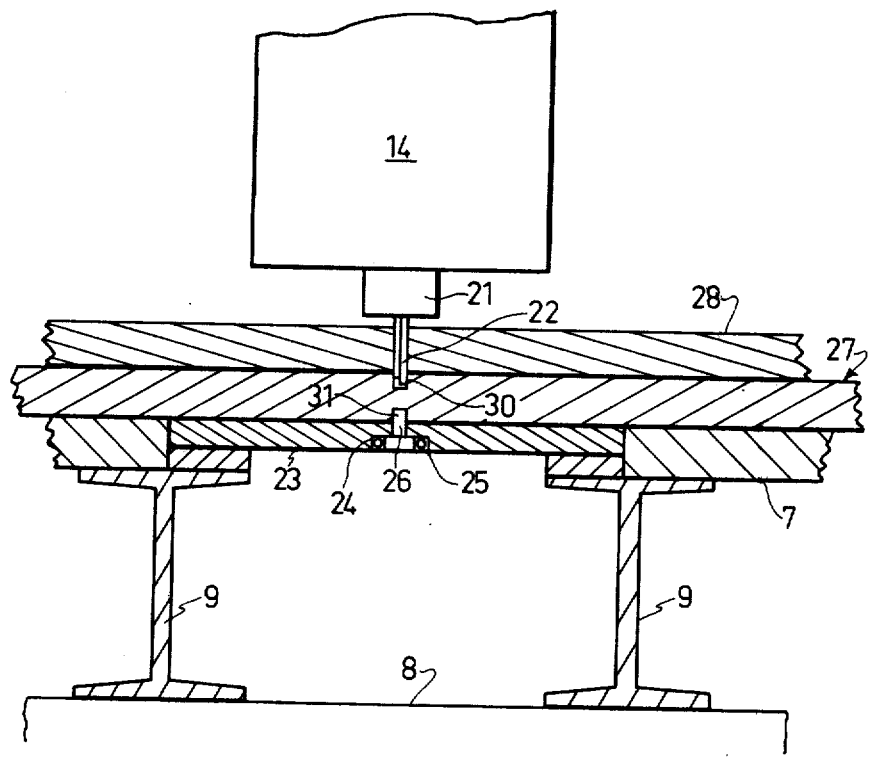
FIG. 3 is a fragmentary elevation to an enlarged scale in section in the vicinity of the routing tool.

The machine 6 used for cutting out drawer and/or door panels etc., from a timber veneered and laminate particle board is shown in FIGS. 1 and 3. Although the invention has particular application to the use of this material it is possible to use solid-core or other timbers. An extensive and rigidly constructed worktable 7 is supported on a suitable metal frame 8. A pair of rolled steel joists 9 extend in a medial position beneath the table 7 and project beyond the rear edge 10 thereof. Four short but substantial columns 11 extend vertically from the projecting ends of the joists 9 and a further pair of joists 12 are secured to the tops of the columns 11 so that said joists 12 extend rigidly above and parallel to the table top 7. Vertical guides 13 are secured to the free ends of the joists 12 above the table 7 and a vertically displaceable saddle 14 is slidably mounted in the guides 13. A pneumatic cylinder 15 secured to the joists 12 is provided to raise or lower the saddle by means of a medially pivotted beam 16. A vertical spindle 17 is rotatably mounted in bearings 18 secured to the saddle 14 and an electric motor 19 is adapted to drive the spindle 17 through a belt 20. A tool chuck 21 is mounted on the lower end of the spindle 17 and a thin cylindrical routing tool 22 is secured in the chuck 21.

A face plate 23 is set flush into the surface of the worktable 7 and a counter bored aperture 24 is formed in the plate 23 in alignment with the axis of the spindle 17. A caged ball bearing 25 is secured within the larger portion of the aperture 24 and a guide pin 26 is secured in the bearing 25 so that the pin 26 projects a short distance above the surface of the table 7. The pin 26 is of the same diameter as the tool 22. As will be obvious later the guide pin 26 need not necessarily be in alignment with the axis of spindle 17 providing that the machine 6 has been so designed to operate in this way.

A template 27 is adapted to hold a veneered particle board workpiece 28 whilst it is being cut by the tool 22. The template 27 is preferably an aluminium casting in the form of a rectangular sheet with upturned flanges 29 along two parallel edges. Grooves 30 and 31 are cut in the top and bottom surfaces of the template 27. Both said grooves 30 and 31 are the exact shape of the required external contour of a panel 32 required to be from the workpiece 28, and the tool 22 and the pin 26 are a clearance fit within the grooves 30 and 31, respectively. As an alternative, the groove 30 may be omitted if the workpiece 28 is supported spaced from the upper surface of the template 27.

In operation the workpiece 28 is secured within the template 27 by means of clamping bolts 33 and placed below the tool 22 which will be in its fully raised position. The template 27 will be moved until the pin 26 engages the underside template groove 31 whereupon the template 27 will rest flush upon the table top 7. The tool 22 can now be set revolving and then lowered by means of the cylinder 15 so that said tool pierces the workpiece 28. The template 27 and workpiece 28 can now be moved over the surface of the table 7 so that the tool 22 cuts out a panel 32 from said workpiece which will have a similar contour to the groove 31.

Preferably the tool 22 will be lowered progressively in three separate stages so that only on the final cut will the tool pierce right through the workpiece 28. During the final cut the tool end will enter the groove 30 in the template as shown in FIG. 3. Thus, it can be appreciated that with relatively unskilled labour panels can be cut from timber sheets which will perfectly match in grain and have a uniform clearance from their respective sheets.

Figure 4:
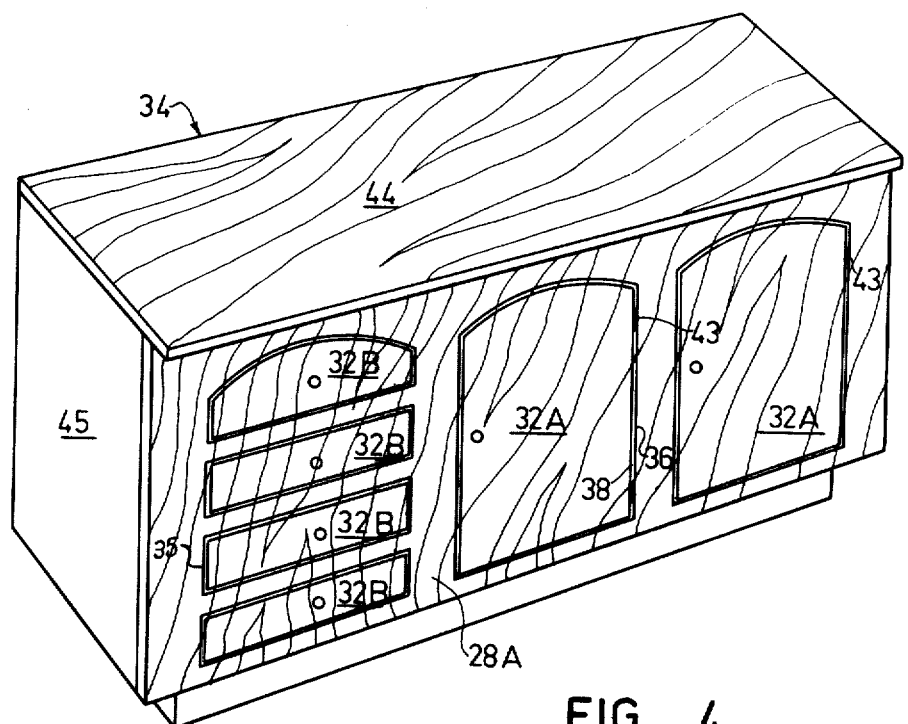
FIG. 4 is a perspective view of a typical article of furniture with door and drawer openings formed according to the invention.

A typical cupboard 34 is shown in FIG. 4. In this case the cupboard front panel 28A will be the workpiece to be cut by the machine 6, before the cupboard 34 is assembled. A more complicated template than that already described will be required, with pairs of grooves contoured to suit drawer openings 35 and door openings 36. The machine 6 will cut out panels 32A from the door openings 36 which can be easily used as doors; and also panels 32B, which can be easily used as drawer fronts.

Figure 2:
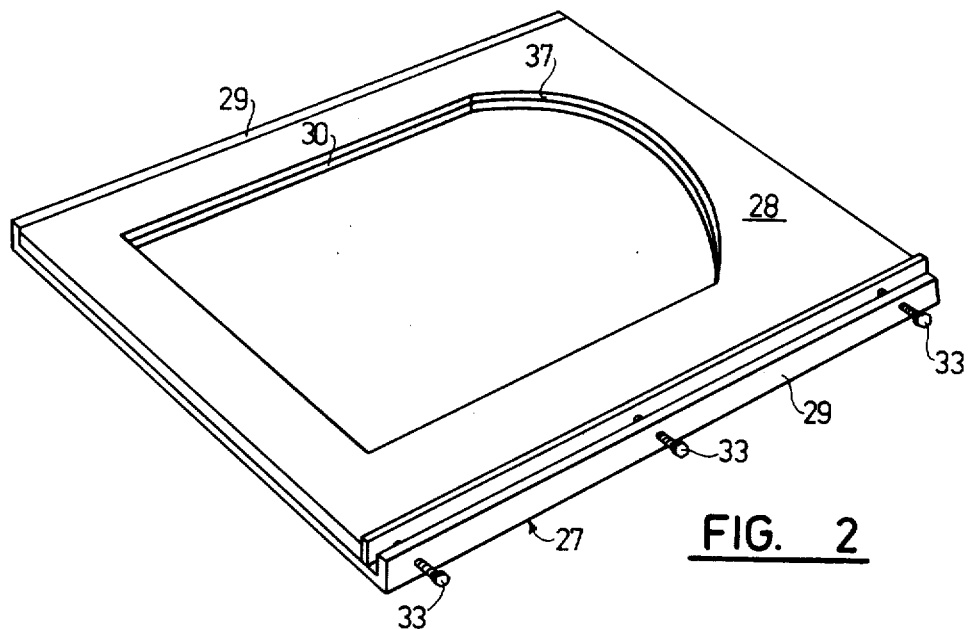
FIG. 2 is a perspective view of a typical template used to hold a workpiece, from which a panel has been cut out.
Figure 5:
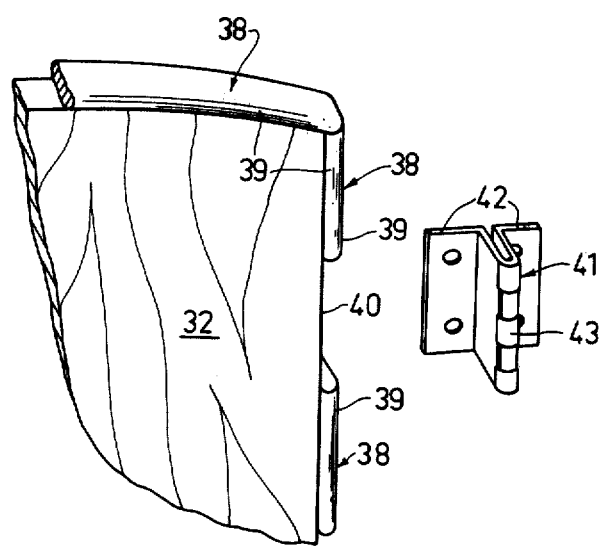
FIG. 5 is a fragmentary perspective view of a panel cut from a cupboard front showing portion of beading and a hinge displaced from its normal position.

The panels 32A and 32B will be slightly smaller than the apertures 37 (see FIG.2) which remain after their removal, due to the width of cut made by the tool 22. The cut will be approximately one quarter of an inch wide and to fill this gap thin edging strips 38 (FIGS. 4 and 5), i.e., edge beading moulding or filling, are glued to the periphery of the cut out panels 32 and/or to the edge of the apertures 37. The beading 38 may have a radiused front edge 39, or other shape, which gives a pleasing appearance to the completed door or drawer as shown in FIG. 5. Gaps 40 can be left in the beading 38 to accommodate special hinges 41. The leaves 42 of said hinges extend rearwardly and are bent at right angles to form coplanar flanges so that the hinges 41 can be secured both to the back of the panel 32 and its aperture 37 so that only the articulated front edge 43 of each hinge will be seen from the front of the cupboard 34. The said articulated front edges 43 of the hinges are adapted to be of the same radius and width as the beading 38. This hinge 41 is especially advantageous, for a preferred finish, as besides blending with the furnishing of the unit its fixing screws are anchored into the solid reverse face of the particle board and not into the insecure edges of the board. Together with the rawness of edges, the latter has been a drawback detracting from the use of laminated and veneered particle board for sturdy quality furniture which has hitherto featured structural forward frames with fitted doors. Butt hinges have been relied upon in the past as there has been no acess for fixing from behind the panel after assembly. The form of hinge shown in FIG. 5 avoids edge screwing as explained and by the present invention the entire frontispiece together with hinged panels may be completed before assembly of the furniture.

After it has been cut, the front panel 28A forms the key piece on to which the top 44, ends 45, and other parts of the cupboard are secured. This key piece form of construction ensures the rigidity and squareness of the finished cupboard. It will be appreciated that other articles of furniture such as wardrobes, chests of drawers, kitchen sink and cupboard units whether in-built or separate furniture, can all be constructed in the manner above described.

What I claim is:

1. A method of producing for furniture a frontispiece of sheet material provided with at least one aperture for access therethrough and a displaceable panel to occupy the aperture, said method comprising cutting out said panel from said sheet material to leave an aperture in the latter, and securing edging strips in such respective positions that when the panel is returned to the aperture said strips are located to occupy at least some of the gap, of the cut, between the panel and the sheet.

2. The method of claim 1, wherein the edging strips are secured to the sheet material at the edges of the aperture.

3. The method of claim 1, wherein the edging strips are secured to the panel on at least some of its edges.

4. The method of claim 1, wherein the edging strips are secured some to the edges of the aperture in the sheet material and some to the edges of the panel.

5. The method of claim 1, wherein in the cutting out of the panel a rotatable routing tool is employed.

6. A method of producing for furniture a frontispiece of sheet material provided with at least one aperture for access therethrough and a displaceable panel to occupy the aperture, said method comprising placing said sheet material on a worktable adjacent a rotatable routing tool, advancing the routing tool to cut into the sheet material, imparting predetermined relative movement between the sheet material and the routing tool whereby the latter progressively cuts out a panel from the former to leave a predetermined aperture, and subsequently securing edging strips in such respective positions that when the panel is returned to the aperture said strips are located to occupy at least some of the gap, represented by the cut of the routing tool, and located between the panel and the sheet.

7. The method claimed in claim 6, wherein the sheet material is attached to a support before being placed on the worktable, in the cutting out of the panel the sheet material and support are moved beneath a fixed mount for the routing tool, and the shape and size of the aperture formed in the sheet material is controlled by template means between the worktable and said support.

8. The method claimed in claim 6, wherein the edging strips are secured to the panel and/or to the sheet material.

9. The method claimed in claim 6, wherein the routing tool is advanced in successive stages before piercing the sheet material.

10. The method of claim 1, comprising the steps of hinging the panel to the sheet material and subsequently securing side and top structure parts to the frontispiece.

11. The method of claim 1, comprising the steps of securing side and top structural parts to the frontispiece, and employing the panel to form the front of a drawer which is enterable through the aperture.

* * * * *